(12) United States Patent
Lee

(10) Patent No.: US 10,315,797 B2
(45) Date of Patent: Jun. 11, 2019

(54) STACKABLE RECEPTACLE FOR THE SHIPMENT OF GOODS

(71) Applicant: United States Postal Service, Washington, DC (US)

(72) Inventor: Jim E. Lee, St. Leonard, MD (US)

(73) Assignee: United States Postal Service, Washington, DC (US)

( * ) Notice: Subject to any disclaimer, the term of this patent is extended or adjusted under 35 U.S.C. 154(b) by 0 days.

(21) Appl. No.: 15/994,886

(22) Filed: May 31, 2018

(65) Prior Publication Data

US 2018/0273235 A1 Sep. 27, 2018

Related U.S. Application Data

(60) Division of application No. 15/386,547, filed on Dec. 21, 2016, now Pat. No. 10,011,386, which is a continuation of application No. 15/254,380, filed on Sep. 1, 2016, now Pat. No. 9,540,132.

(60) Provisional application No. 62/220,816, filed on Sep. 18, 2015.

(51) Int. Cl.
| | |
|---|---|
| *B65D 5/00* | (2006.01) |
| *B65D 5/02* | (2006.01) |
| *B65D 5/10* | (2006.01) |
| *B65D 5/14* | (2006.01) |
| *B65D 5/42* | (2006.01) |
| *B65D 5/49* | (2006.01) |
| *B65D 5/468* | (2006.01) |

(52) U.S. Cl.
CPC ............ *B65D 5/001* (2013.01); *B65D 5/0245* (2013.01); *B65D 5/0281* (2013.01); *B65D 5/10* (2013.01); *B65D 5/14* (2013.01); *B65D 5/4266* (2013.01); *B65D 5/4608* (2013.01); *B65D 5/48024* (2013.01); *Y02W 30/807* (2015.05)

(58) Field of Classification Search
CPC ........ B65D 5/001; B65D 5/0281; B65D 5/10; B65D 5/14; B65D 5/4266; B65D 5/4608; B65D 5/22; B65D 5/008; B65D 5/0035; B65D 5/103; B65D 5/3607
USPC ...... 229/114, 915, 163, 117.17, 117.16, 178, 229/149, 176, 113, 117.15, 132, 148, 150, 229/185, 185.1, 931; 206/424
See application file for complete search history.

(56) References Cited

U.S. PATENT DOCUMENTS

| | | | | |
|---|---|---|---|---|
| 1,941,514 | A | * | 1/1934 | Sutherland ............... B65D 5/18 229/114 |
| 2,418,963 | A | | 4/1947 | Anderson, Jr. |
| 2,572,387 | A | | 10/1951 | Rayburn |
| 2,591,882 | A | | 4/1952 | Shirley |
| 2,858,058 | A | * | 10/1958 | Kitchell ................... B65D 5/22 229/117.16 |

(Continued)

FOREIGN PATENT DOCUMENTS

| | | |
|---|---|---|
| EP | 1876103 A1 | 1/2008 |
| GB | 2077703 A | 12/1981 |
| GB | 2085409 A | 4/1982 |

*Primary Examiner* — Christopher R Demeree
(74) *Attorney, Agent, or Firm* — Knobbe Martens Olson & Bear LLP

(57) ABSTRACT

Embodiments of a reusable stackable shipping box are provided herein. The reusable stackable shipping box may be reused and cleaned without causing harm to the integrity of the box. In addition, the box is slightly tapered in shape such that the box may be stacked upon and within other boxes for ease in shipping and organization.

7 Claims, 8 Drawing Sheets

(56) References Cited

U.S. PATENT DOCUMENTS

| | | | |
|---|---|---|---|
| 2,874,866 A | 2/1959 | Rudy | |
| 2,893,621 A * | 7/1959 | Harnish | B65D 5/0035 |
| | | | 206/509 |
| 2,902,200 A | 9/1959 | Manners | |
| 2,947,462 A | 8/1960 | Bostock | |
| 2,957,615 A * | 10/1960 | Karr | B65D 5/22 |
| | | | 229/117.16 |
| 3,055,569 A * | 9/1962 | Layne, Sr. | B65D 5/18 |
| | | | 229/117.17 |
| 3,095,137 A | 6/1963 | Reynolds | |
| 3,107,041 A | 10/1963 | Wagner, Jr. | |
| 3,119,545 A | 1/1964 | Guilikson | |
| 3,170,616 A | 2/1965 | Crozier | |
| 3,302,852 A | 2/1967 | Johnson et al. | |
| 3,756,499 A * | 9/1973 | Giebel | B65D 5/22 |
| | | | 229/117.17 |
| 3,758,018 A | 9/1973 | Black | |
| 3,849,224 A | 11/1974 | Hintz et al. | |
| 3,866,745 A | 2/1975 | Dlugopolski | |
| 4,088,262 A | 5/1978 | Kuehlhorn | |
| 4,101,022 A | 7/1978 | Watkins | |
| 4,124,679 A | 11/1978 | DeWitt | |
| 4,324,357 A | 4/1982 | Murkowski | |
| 4,339,069 A * | 7/1982 | Poteet | B65D 5/6632 |
| | | | 229/117.17 |
| 4,739,921 A | 4/1988 | Taub | |
| 5,011,071 A | 4/1991 | Lopez | |
| D326,341 S | 5/1992 | Frauhiger | |
| 5,184,772 A | 2/1993 | McGrath | |
| 5,228,617 A | 7/1993 | McGrath | |
| 5,240,176 A | 8/1993 | Akers | |
| 5,263,635 A | 11/1993 | Fitzgerald | |
| 5,271,551 A | 12/1993 | Roepke | |
| 5,275,331 A | 1/1994 | Chung-Piao | |
| 5,494,161 A | 2/1996 | Herbst | |
| D424,117 S | 5/2000 | Steinbeck et al. | |
| D425,128 S | 5/2000 | Conley et al. | |
| D425,562 S | 5/2000 | Conley et al. | |
| 6,402,020 B1 | 6/2002 | McClure | |
| 6,719,191 B1 | 4/2004 | Christensen et al. | |
| D501,318 S | 2/2005 | Louie et al. | |
| D505,069 S | 5/2005 | Keberlein | |
| D514,928 S | 2/2006 | Keberlein | |
| D538,536 S | 3/2007 | Kopenhaver et al. | |
| D542,532 S | 5/2007 | Kopenhaver et al. | |
| D546,675 S | 7/2007 | Keberlein | |
| 7,325,718 B2 * | 2/2008 | Cook | B65D 5/008 |
| | | | 220/826 |
| 7,370,757 B2 | 5/2008 | Scheid, Sr. et al. | |
| D584,143 S | 1/2009 | Lee | |
| D598,285 S | 8/2009 | Mittelstaedt | |
| D605,899 S | 12/2009 | Meether et al. | |
| D608,634 S | 1/2010 | Riedi | |
| 7,870,993 B2 | 1/2011 | Walling | |
| D651,908 S | 1/2012 | Boyer et al. | |
| D652,312 S | 1/2012 | Boyer et al. | |
| D657,687 S | 4/2012 | Boyer et al. | |
| D666,830 S | 9/2012 | Glenn | |
| D705,054 S | 5/2014 | McCarthy | |
| D719,018 S | 12/2014 | Levy et al. | |
| D727,142 S | 4/2015 | Bankowski | |
| D742,740 S | 11/2015 | Kim et al. | |
| D745,392 S | 12/2015 | Solovov, Jr. et al. | |
| 9,242,759 B2 | 1/2016 | Scott | |
| D749,944 S | 2/2016 | Kummerfeldt | |
| D764,279 S | 8/2016 | Sevsek | |
| D766,020 S | 9/2016 | Thatcher | |
| D770,771 S | 11/2016 | Lisso et al. | |
| 9,540,132 B1 * | 1/2017 | Lee | B65D 5/0245 |
| D780,452 S | 3/2017 | Stratton et al. | |
| 2005/0017063 A1 | 1/2005 | Noone et al. | |
| 2005/0150939 A1 | 7/2005 | Fakes et al. | |
| 2006/0213958 A1 | 9/2006 | Valenzuela et al. | |
| 2008/0237325 A1 * | 10/2008 | Mittelstaedt | B65D 5/22 |
| | | | 229/117.17 |
| 2009/0173773 A1 | 7/2009 | Blin | |
| 2011/0204130 A1 | 8/2011 | McLeod | |
| 2015/0096921 A1 | 4/2015 | Hyatt | |
| 2016/0137333 A1 | 5/2016 | Brundage | |
| 2016/0137334 A1 * | 5/2016 | Garland | B65D 5/008 |
| | | | 229/113 |

* cited by examiner

STACKABLE RECEPTACLE FOR THE SHIPMENT OF GOODS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. This application is a divisional of U.S. application Ser. No. 15/386,547, filed Dec. 12, 2016, which is a continuation of U.S. application Ser. No. 15/254,380, filed Sep. 1, 2016, which, in turn, claims the benefit of priority to U.S. Provisional application No. 62/220,816, filed Sep. 18, 2015, the entire contents of which are herein incorporated by reference.

BACKGROUND

Field

The disclosure relates to the field of boxes and receptacles, and in particular, to reusable stackable receptacles used for shipping and organizing goods and items, including perishable foods. Also disclosed herein are methods of making said reusable stackable receptacles.

Description

An increasing demand for the shipment of goods, including perishable goods, presents the problem of efficiently delivering these goods. In particular, it is difficult to deliver such goods without damaging the goods within the box. Perishable goods in particular are difficult to ship because of the need to adequately control the environment inside the shipping container, such as the temperature.

In addition to the difficulty of protecting the goods located in the boxes, there is the added problem of protecting the shipping box itself. For the shipment of perishable goods, in particular, it is sometimes commonplace to reuse the shipping container. Many goods, including perishable items, release moisture or create condensation, which penetrates the shipping container, resulting in a rapid breakdown of the shipping container such that it is unfit for reuse. Other goods soil the shipping container such that it would be unfit for reuse without first cleaning the container. In addition, the nature of reusing shipping containers presents the problem of damaging the boxes as a result of the constant handling and reuse.

Because the shipment of goods, including perishable foods, is ever increasing, it is increasingly necessary to organize the individual items within a suitable container, and to further organize the mass of orders. Typically, such organization is performed through stacking. However, many shipping boxes are unable to adequately stack in such a manner that the goods inside are sufficiently protected and the stacked boxes themselves are stacked in a stable manner.

SUMMARY

The devices and methods of the disclosure each have several aspects, no single one of which is solely responsible for its desirable attributes. Without limiting the scope of this disclosure as expressed by the claims which follow, its more prominent features will now be discussed briefly. After considering the following detailed descriptions and drawings, one will understand how the features of this disclosure provide advantages that include a foldable box configured for retaining items and configured for stacking with other boxes as described herein.

One embodiment comprises a reusable stackable box for the shipment and organization of goods, including perishable or non-perishable goods. A box is provided, wherein the box may be formed of a unitary piece of material, or alternatively may be comprised of various portions or pieces that are joined together by means of attachment, such as by glue, tape, adhesive, or staples. The box comprises four main side walls, referred herein as front face, first side face, rear face, and second side face. The front face is attached along one side to the first side face, which is attached along the opposite side to the rear face, which is attached to the second side face. Each face respectively has a flap, which is designed for assembly purposes and for conferring stackable features to the box. The box may further comprise a water- and grease-resistant lining that allows the box to be readily reused and to withstand occasions when the box becomes wet, soiled, or otherwise blemished by the shipment or storage of particular goods. These features, together with other features herein further explained, will become obvious through a reading of the following description of the drawings and detailed description.

In one aspect, a receptacle for the shipment of goods comprises a front face comprising a front handle opening; a front flap comprising a front support slot, the front flap attached to the front face along an edge of the front face; a first side face having first support slots formed therein, the first side face attached to the front face; a first segment attached to the first side face along an edge of the first side face; a first flap attached to the first segment along an edge of the first segment, the first flap comprising second support tabs formed along a first edge of the first flap, a front support tab formed along a second edge of the first flap, and a rear support tab formed along a third edge of the first flap; a rear face comprising a rear handle opening, the rear face attached to the first side face; a rear flap attached along an edge of the rear face, the rear flap having a rear support slot formed therein; a second side face attached to the rear face; a second segment attached to the second side face along an edge of the second side face; a second flap attached to the second segment along an edge of the second segment, wherein the second flap comprises second support slots and first support tabs; wherein the first support tabs are configured for insertion into the first support slots, the second support tabs are configured for insertion into the second support slots, and wherein the front support tab is configured for insertion into the front support slot, and the rear support tab is configured for insertion into the rear support slot.

In some embodiments, the first segment and second segments are attached to the first and second side faces respectively so as to fold along the edges of the first and second side faces to which the first and second segments are attached.

In some embodiments, the first segment and second segments are attached to the first and second side flaps respectively so as to fold along the edges of the first and second side flaps to which the first and second segments are attached.

In some embodiments, the first and second segments are folded along the edge of the first and second side faces to which the first and second segments are attached through an angle of about 180° such that the first and second segments are substantially parallel to and substantially flush with the first and second side faces, respectively.

In some embodiments, the first and segments are folded along the edge of the first and second side flaps to which the first and second segments are attached so as to form an angle of about 90° degrees between the first and second segments and the first and second side flaps.

In some embodiments, the first and second side flaps form a platform extending in a direction generally perpendicular to the first and second side faces.

In some embodiments, the first side face has a plurality of third support slots formed therein; the second side face has a plurality of fourth support slots formed therein; the front flap has a plurality of third support tabs formed thereon; and the rear flap has a plurality of fourth support tabs formed thereon; wherein at least one of the plurality of third support tabs is configured for insertion into one of the plurality of third support slots and at least another one of the plurality of third support tabs is configured for insertion to one of the plurality of fourth support slots; and wherein at least one of the plurality of fourth support tabs is configured for insertion into one of the plurality of third support slots and at least another one of the plurality of fourth support tabs is configured for insertion to one of the plurality of fourth support slots.

In some embodiments, the front face, rear face, and the first and second side faces comprise at least one linerboard, and wherein a water-resistant material is applied to the at least one linerboards.

In some embodiments, the front and rear faces are each tapered from a first dimension to a second dimension along a width of the front and rear faces.

In some embodiments, the edge of the front face to which the front flap is attached corresponds to the first dimension, and is larger than the dimension of an edge of the front face opposite the edge of the front face to which the front flap is attached, and wherein the edge of the rear face to which the rear flap is attached corresponds to the first dimension, and is larger than the dimension of an edge of the rear face opposite the edge of the rear face to which the rear flap is attached.

In some embodiments, the first side face and the second side faces are each tapered from a first dimension to a second dimension.

In some embodiments, the first dimension of the first side face corresponds to a top section of the first side face proximate the first segment and the second dimension of the first side face corresponds is proximate the second bottom fold, and wherein the first dimension of the second side face corresponds to a top section of the second side face proximate the second segment and the second dimension of the second side face is proximate the fourth bottom fold.

In some embodiments, the receptacle further comprises a removable divider insertable into the receptacle to divide an interior volume of the receptacle into at least two sections.

In some embodiments, the divider comprises a vertical portion and a horizontal portion, the horizontal portion having a support portion extending from the horizontal portion to a bottom surface of the receptacle, the support portion forming a shelf, thereby forming three sections within an internal volume of the receptacle.

In some embodiments, the second side flap comprises a finger slot formed therein In another aspect described herein, a method for assembling a receptacle comprises providing a receptacle comprising a front face comprising a front handle opening; a front flap comprising a front support slot, the front flap attached to the front face along an edge of the front face; a first side face having first support slots formed therein, the first side face attached to the front face; a first segment attached to the first side face along an edge of the first side face; a first flap attached to the first segment along an edge of the first segment, the first flap comprising second support tabs formed along a first edge of the first flap, a front support tab formed along a second edge of the first flap, and a rear support tab formed along a third edge of the first flap; a rear face comprising a rear handle opening, the rear face attached to the first side face; a rear flap attached along an edge of the rear face, the rear flap having a rear support slot formed therein; second side face attached to the rear face; a second segment attached to the second side face along an edge of the second side face; a second flap attached to the second segment along an edge of the second segment, wherein the second flap comprises second support slots and first support tabs; folding the front flap along the edge along a score line corresponding to the edge of the front face to which the front flap is attached; folding the second segment along a score line corresponding to the edge of the second side face to which the second segment is attached such that at least a portion of a first planar surface of the second segment contacts a second planar surface of the second side face; folding the second segment along a score line corresponding to the edge of the second segment which is attached to the second flap to approximately a right angle to the first planar surface of the second segment; inserting the first support tabs into the first support slots; folding the first segment along a score line corresponding to the edge of the first side face to which the first segment is attached such that at least a portion of a first planar surface of the first segment contacts a second planar surface of the first side face; folding the first segment along a score line corresponding to the edge of the first segment which is attached to the first flap to approximately a right angle relative to first planar surface of the first segment; inserting the second support tabs into the second support slots; inserting the front support tab into the front support slot; and inserting the rear support tab into the rear support slot.

In some embodiments, the first side face has a plurality of third support slots formed therein; the second side face has a plurality of fourth support slots formed therein; the front flap has a plurality of third support tabs formed thereon; the rear flap has a plurality of fourth support tabs formed thereon; and wherein the method further comprises inserting one of the plurality of third support tabs into one of the plurality of third support slots; inserting one of the plurality of third support tabs into one of the plurality of fourth support slots; inserting one of the plurality of fourth support tabs into one of the plurality of third support slots; inserting one of the plurality of fourth support tabs into one of the plurality of fourth support slots.

In some embodiments, the method further comprises attaching a joint segment, which is attached to the second side face, to the front face.

BRIEF DESCRIPTION OF THE DRAWINGS

In addition to the features described above, additional features and variations will be readily apparent from the following descriptions of the drawings and exemplary embodiments. It is to be understood that these drawings depict typical embodiments, and are not intended to be limiting in scope.

DETAILED DESCRIPTION

Figure 1A:
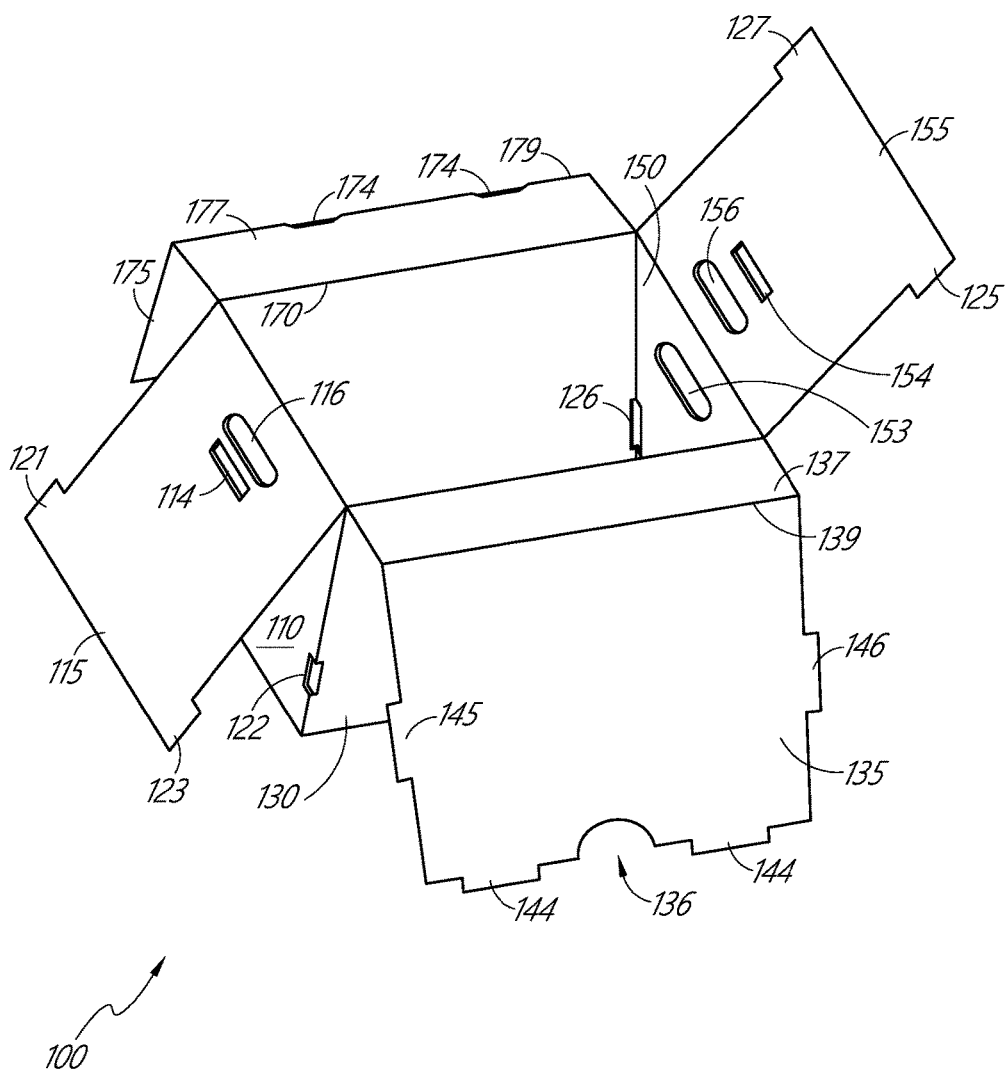
FIG. 1A illustrates a perspective view of one embodiment of a reusable stackable shipping box in an upright, assembled, opened position.

The invention is described in various exemplary embodiments and implementations as provided herein. However, it should be understood that the various features, aspects, and functionalities described in one or more of the individual embodiments are not limited in their applicability to the particular embodiment with which they are described. Instead, they can be applied alone or in various combinations to one or more of the other embodiments of the invention, whether the embodiments are described or whether the features are presented as being a part of the described embodiment. The breadth and scope of the present invention should not be limited by any exemplary embodiments described or shown herein.

In some embodiments, a reusable stackable shipping receptacle is provided. It is to be understood that as used throughout this disclosure, the term receptacle may refer to a box, a container, or other item used for the shipment of goods. The reusable stackable shipping receptacle is useful for shipping various items, including perishable and non-perishable goods. As used herein, and as recognized by those of skill in the art, non-limiting examples of perishable goods can include, for example, foodstuffs, medications, and plants. Non-limiting examples of nonperishable goods can include, for example, electronics, media, textiles, and other nonperishable materials suitable for shipment. The reusable stackable shipping box disclosed herein is robust and sturdy so as to provide a protected environment for the items contained therein. The shipping box is also capable of reuse. The stackable shipping box is capable of being stacked upon other boxes and having other boxes stacked upon it, while retaining its ability to protect the goods inside. The box may be constructed of a durable material, such as corrugated fiberboard, paperboard, plastics, polymers, and recycled materials. The reusable stackable shipping box may additionally have water- and grease-resistant coatings, which protect the box from becoming saturated with moisture or oils, as can commonly occur when shipping food items. In addition, the coating allows a user to readily clean the box for reuse when the box becomes soiled, scuffed, marked, and otherwise blemished without damaging the box.

Surfaces of the reusable box are described as being substantially parallel or substantially perpendicular to one another. As used herein, the terms substantially parallel and substantially parallel are used to describe surfaces that may not be exactly perpendicular or parallel due to a tapering of the reusable box from a top opening toward a bottom. Thus, a surface which tapers toward another surface can be described as being substantially parallel or perpendicular to the other surface.

The present disclosure may refer to various portions of a receptacle being attached along an edge, and may refer to folding a segment along an edge. By describing a particular surface or segment of a receptacle as being folded does not mean only that the section or segment being discussed has a fold formed directly there, but can also refer to folding of a segment along an edge or a scoreline proximate or bordering the section or segment. A description of folding a particular segment can mean folding along an edge or score line bordering or proximate to the particular segment.

Figure 1B:
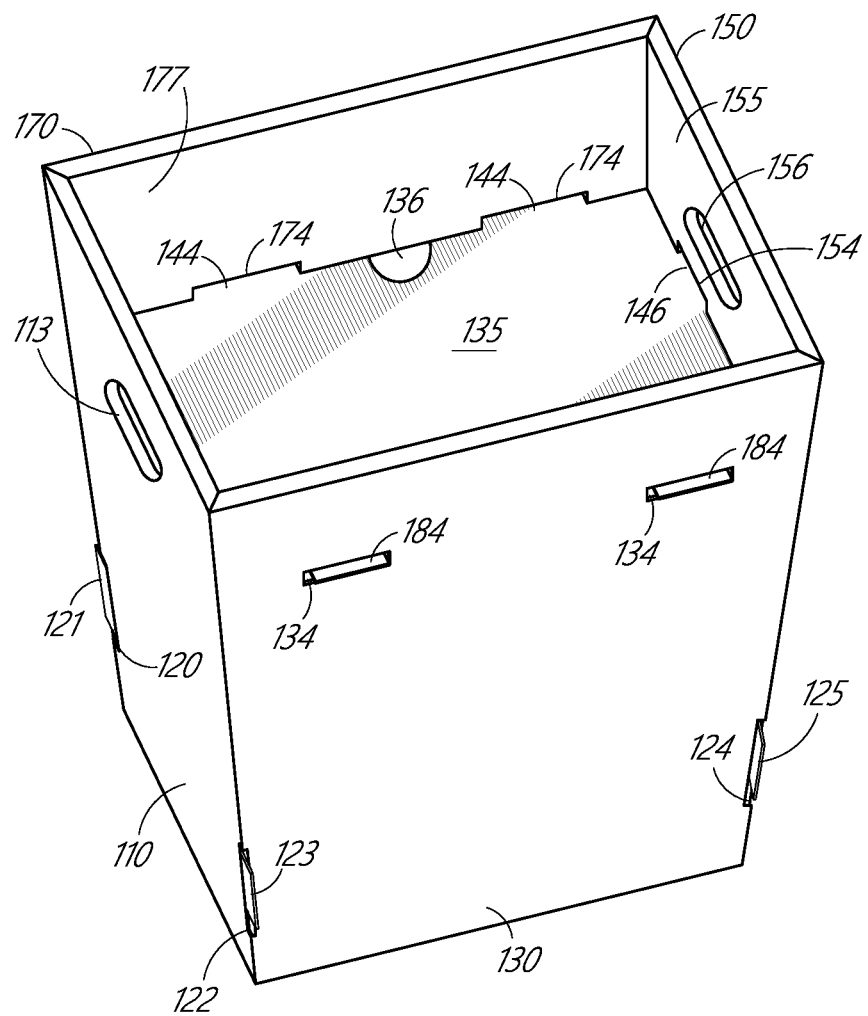
FIG. 1B illustrates a perspective view of one embodiment of a reusable stackable shipping box in an upright, assembled, closed position

FIG. 1A depicts one embodiment of the reusable box in its upright, assembled, opened position. FIG. 1B depicts the reusable box in its upright, assembled, closed position. The following description refers to both FIG. 1A and FIG. 1B. In this embodiment, a reusable stackable shipping box is provided, wherein the box 100 comprises a front face 110, a front flap 115, a first side face 130, a first side flap 135, a rear face 150, a rear flap 155, a second side face 170, a second side flap 175, and a closed bottom (not shown). As used herein the term face can refer to a side, a panel, a wall, or an inside or outside surface of the box.

The front face 110 comprises a first front elongated handle opening 113, which may be used by an individual as a handle to grasp or carry the box 100, and a second front elongated handle opening 116 extends through an upper portion of the front face 110 which corresponds to the first front elongated handle opening 113 when the front flap is folded down into the reusable box. For purposes of this disclosure, an opening, such as the elongated handle opening described herein, may be a cavity, slot, or aperture that extends through a portion of the surface or which extends entirely through the surface of the material in which the opening is formed. The front face 110 is attached to the front flap 115 along the upper length of the front face 110. The front face 110 may be attached to the front flap 115 by any means of attachment, including, for example, with tape, glue, or staples. In some embodiments, it may be integrally formed as a unitary piece of material, wherein a score line or a fold runs the length of the front face 110, and demarcates the front face 110 from the front flap 115. For purpose of this disclosure, a score line may be, for example, an indentation, depression, imprint, weakness, hash, or perforation in the box material that is provided to allow the two portions demarcated by the score line to fold, bend, flex, hinge, or move along the score line.

In some embodiments, the front face 100 is tapered from the top portion where it connects to the front flap to a bottom portion, such that the top portion is longer than the bottom portion. The taper of the front face 110 imparts a taper to the box 100 when the box is assembled, as will be described elsewhere herein.

The front flap 115 comprises the second front elongated handle opening 116, which extends through the upper portion of the front flap 115, and which may be configured in size, shape, and location for alignment with the first front elongated handle opening 113 of the front face 110. The front flap 115 also comprises a front support slot 114 that extends through the surface of the front flap 115. As described herein, a slot may be, for example, a recess, hole, groove, or opening that may extend partially or entirely through the surface of the reusable box, and is configured in size, shape, and location to receive a tab for insertion. The front flap 115 comprises a first assembly tab 121 and a second assembly tab 123 which are configured in size, shape, and location for assembly purposes, as described below. As described herein, a tab may be, for example, a segment, extension, or section of a surface that is configured in size, shape, and location for insertion into a slot.

The rear face 150 is similar to and comprises similar features as the front face 110, and is also tapered, similar to front face 110. For example, the rear face 150 comprises a first rear elongated handle opening 153 that extends through the surface of the rear face 150. The rear face 150 is attached to the rear flap 155. The rear face 150 may be attached to the rear face 155 with attachment means, for example, with tape, glue, or staples. In some embodiments, the rear face 150 may be attached to the rear flap 155 as a unitary piece of material, wherein a score line or fold runs the length of the rear face 150, and demarcates the rear face 155 from the rear flap 155.

The rear flap 155 comprises a second rear elongated handle opening 156 that extends through the surface of the rear flap 155, and that is configured in size, shape, and location for alignment with the first rear elongated handle opening 153 of the rear face 150 when the reusable box is closed. The rear flap 155 additionally comprises a rear support slot 154 that extends through the surface of the rear flap 155. The rear flap 155 comprises a third assembly tab 125 and a fourth assembly tab 127 that are configured in size, shape, and location for assembly purposes, described below.

The first side face 130 is attached to the front face 110 along a front vertical line, such that the first side face 130 is substantially perpendicular to the front face 110 when the box 100 is in its upright, assembled position. The first side face 130 is also attached to the rear face 150 along a rear vertical line, such that the first side face 130 is substantially perpendicular to the rear face 150, and the rear face 150 is substantially parallel to the front face 110. The first side face 130 may be attached to the front face 110 and the rear face 150 with attachment means, such as with glue, tape, or staples. The first side face 130 may be attached to the front face 110 or the rear face 150 as a unitary piece of material, wherein a score line demarcates the respective faces. The first side face 130 comprises first support slots 134. The first side face further comprises a second assembly slot 122 and a third assembly slot 124, which are configured in size, shape, and location for insertion of second assembly tab 123 and third assembly tab 125, respectively.

The first side face 130 is attached to a first segment 137 along the top length. Attachment of the first side face 130 to the first segment 137 is by attachment means, as previously described. In some embodiments, the first segment 137 is attached to a first side flap 135 as a unitary piece of material, and is demarcated by a score line 139 that runs the length of the first side flap 135.

The first side flap 135 is attached to the first segment 137, and comprises second support tabs 144, which are located along the length of the first side flap 135. The first side flap 135 additionally comprises a front support tab 145 and a rear support tab 146. The front support tab 145 is configured in size, shape, and location for insertion into the front support slot 114, and the rear support tab 146 is configured in size, shape, and location for insertion into the rear support slot 154. The first side flap additionally comprise a first finger slot 136.

Opposite from and substantially parallel to the first side face 130 is the second side face 170. The second side face 170 is attached to the front face 110 along a front vertical line, such that the second side face 170 is substantially perpendicular to the front face 110 when the box 100 is in its assembled, upright position. The second side face 170 is attached to the rear face 150 along a rear vertical line, such that the second face 170 is substantially perpendicular to the rear face 150 when the box 100 is in its upright, assembled position. Attachment may be by any of the means described herein. The second side face 170 comprises a first assembly slot 120 and a fourth assembly slot 126 (FIG. 2C), which are configured in size, shape, and location for insertion of the first assembly tab 121 and the fourth assembly tab 127, respectively.

The second side face 170 is attached to a second segment 177 along the top length of the second side face 170. Attachment of the second side face 170 to the second segment 177 is by attachment means, as previously described. In some embodiments, the second segment 177 is attached to a second side flap 175 as a unitary piece of material, and is demarcated by a score line 179 that runs the length of the second side flap 175.

The second side flap 175 comprises first support tabs that are similar to second support tabs 144, which are located along the length of the second side flap 175, and which are configured in size, shape, and location for insertion into the first support slots 134. The second side flap 175 additionally comprises second support slots 174, which are located along the score line 179 that demarcates the second side flap 175 from the second segment 177. The second support slots 174 are configured in size, shape, and location for insertion of the second support tabs 144. The second side flap may additionally comprise a first finger slot (not shown), which is similar to first finger slot 136.

To fold the box 100 into the closed position, as shown in FIG. 1B, the front flap 115 and the rear flap 155 are folded down into the interior of the box 100 along a score line or fold which attached the front and rear faces 110 and 150 to the front and rear flaps 115 and 155. The front support slot 114 and the rear support slot 154 face interior portion of the box 100, and are configured in size, shape, and location for insertion of the front support tab 145 and the rear support tab 146. The front elongated handle openings 113 and 116 align, such that the elongated handle openings 113 and 116 form a void extending through the front face 110 and the front flap 115, and creating a handle grip along the front face 110. Similarly, the rear elongated handle openings 153 and 156 align, providing a handle grip along the rear face 150.

The first assembly tab 121 and a second assembly tab 123 are inserted into the first assembly slot 120 and the second assembly slot 122, respectively, such that the first and second assembly tabs 121, 123 extend into and at least partially through the first and second assembly slots 120, 122. The first and second assembly tabs 121 and 123 are sized and shaped to be releasably retained in the first and second assembly slots 120, 122, such that the front flap 115 is maintained folded into the interior of the box and is maintained substantially parallel and/or in contact with at least a portion of the front face 110. The third and fourth assembly tabs 125, 127 are similarly inserted into third and fourth assembly slots 124, 126, thereby releasably retaining the rear flap 155 substantially parallel to the rear face 150 and/or at least partially in contact with the rear face 150.

The second segment 177 is folded down to contact and/or be substantially parallel to an inner surface of the second side face 170 such that the second segment 177 extends down along the interior surface of the second side face 170 substantially parallel to the second side face 170. The second side flap 175 is folded or bent along score line 179 to extend outward across the opening of the box 100, the second side flap 175 being substantially perpendicular to the second side face 170. The first support tabs (not shown) are inserted into the first support slots 134 formed in the first side face 130, similar to the tabs and slots described elsewhere herein. By inserting the first support tabs into the first support slots 134, the second side flap 175 is releasably maintained substantially perpendicular to the second side face 170 and substantially parallel to the bottom of the box 100. The cooperation of the first support tabs and the first support slots 134 allow the second side flap 175 to bear weight, such as the weight of a second box 100 placed on top of the first box 100.

The first side flap 135 is then folded into the interior of the box 100 such that the first segment 137 extends down into the interior of the box 100, at least partially in contact with or substantially parallel to an inner surface of the first side face 130. The first side flap 135 and the first segment 137 are folded along the score line 139, and the first side flap 135 is extended outward along the top of the second side flap 175, such that it is substantially parallel with the second side flap 175 and/or at least partially in contact with the second side flap 175, and substantially perpendicular to the first side face 130. The second support tabs 144 are inserted into second support slots 174 similar to those described elsewhere herein. The front support tab 145 is inserted into the front support slot 114, and the rear support tab 146 is inserted into the rear support slot 154. As depicted, the front and rear support tabs 145 and 146 do not extend through the front face 110 and the rear face 150, as the front face 100 and the rear face 150 do not have corresponding openings. In some embodiments, the front face 110 and the rear face 150 have openings corresponding to the front and rear support tabs 145 and 146 such that the front and rear support tabs 145, 146 extend through and are visible outside the box 100.

In the closed position, the combination of the first side flap 135 and the second side flap 170 form a surface on which items, such as other boxes 100 can be received and stacked. In the assembled, upright, closed position, the box 100 also has a lip or rim which can extend around a bottom portion of another box 100 stacked thereon.

Those of skill in the art will recognize that the taper of the box 100, or in other words, that the bottom portion of the box 100 is smaller than the top portion of the box, allows for stacking multiple boxes 100 together. such that the bottom portion of one box is capable of sitting in the top portion of a closed box. The top portion of the box has a greater area than the bottom portion of the box. Because the top portion of the box is larger than the bottom portion, the front face 110, rear face 150, first side face 130, and second side face 170 are not exactly perpendicular with the bottom of the box 100. Although the faces are substantially perpendicular, a slight angle is required in order to generate the taper. In some embodiments, the taper of the box can be defined by the algorithm. The taper of the box is set such that the inner surface of the rim or lip of the closed box corresponds to the dimensions of the outside of a bottom perimeter of the closed box, such that when one box 100 is inserted into the recess of another box 100, the inner surface of the rim or lip of the first box 100 mates with the outer diameter of the bottom portion of the second box 100 and creates a friction fit, to securely and releasably hold the boxes 100 together.

Figure 2A:
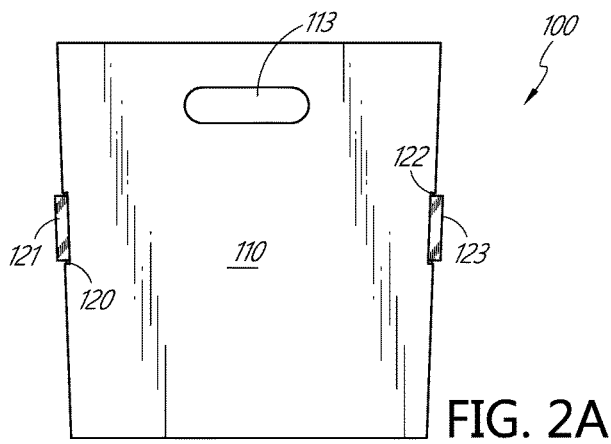
FIG. 2A is a front view of one embodiment of a reusable stackable shipping box in its upright, assembled, closed position.

FIG. 2A illustrates a front view of the front face 110 of one embodiment of the reusable box in its upright, assembled, closed position. The front face 110 may be identical to the rear face 150, and comprises the first front elongated handle opening 113, as described elsewhere herein. The first front elongated handle opening 113 penetrates entirely through the front face 110, such that an individual may use the first front elongated handle opening 113 as a handle to carry or grasp the shipping box. FIG. 2A also illustrates that an embodiment of the box in its upright, assembled, closed position is slightly tapered in shape, such that the top portion of the box is larger than the bottom portion of the box, as described previously. The tapered design allows the box to stack upon and within other stackable shipping boxes.

Figure 2B:
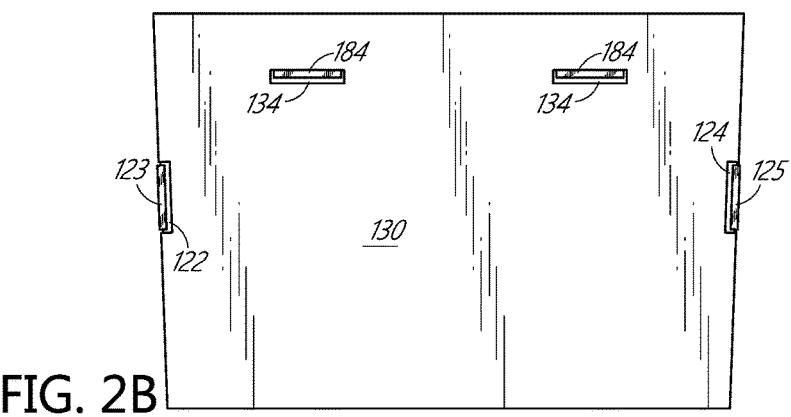
FIG. 2B is a side view of one embodiment of a reusable stackable shipping box in its upright, assembled, closed position.

FIG. 2B illustrates a front view of the first side face 130 of one embodiment of the reusable box in its assembled, upright, closed position. The first side face 130 comprises first support slots 134 that are configured in size and shape for the insertion of first support tabs 184. The first side face 130 also comprises the second assembly slot 122 and the third assembly slot 124 that are useful for assembly of the box 100, as described elsewhere herein.

Figure 2C:
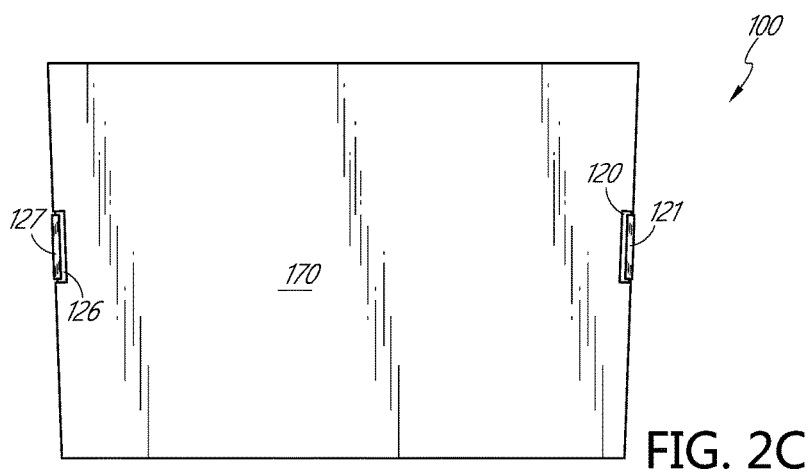
FIG. 2C is a side view of one embodiment of a reusable stackable shipping box in its upright, assembled, closed position, illustrating the opposite side of the embodiment shown in FIG. 2B.

FIG. 2C illustrates a front view of the second side face 170 of one embodiment of the box in its assembled, upright, closed position. Second side face 170 is the face that is opposite the first side face 130, and sits substantially parallel to first side face 130. Second side face 170 comprises the first assembly slot 120 and the fourth assembly slot 126 that are useful for assembly of the box 100. FIGS. 2B and 2C illustrate one embodiment of the stackable shipping box, wherein the box is slightly tapered in shape, such that the top portion of the box is larger than the bottom portion, enabling the box to stack upon and within other stackable shipping boxes, as disclosed previously.

Figure 3A:
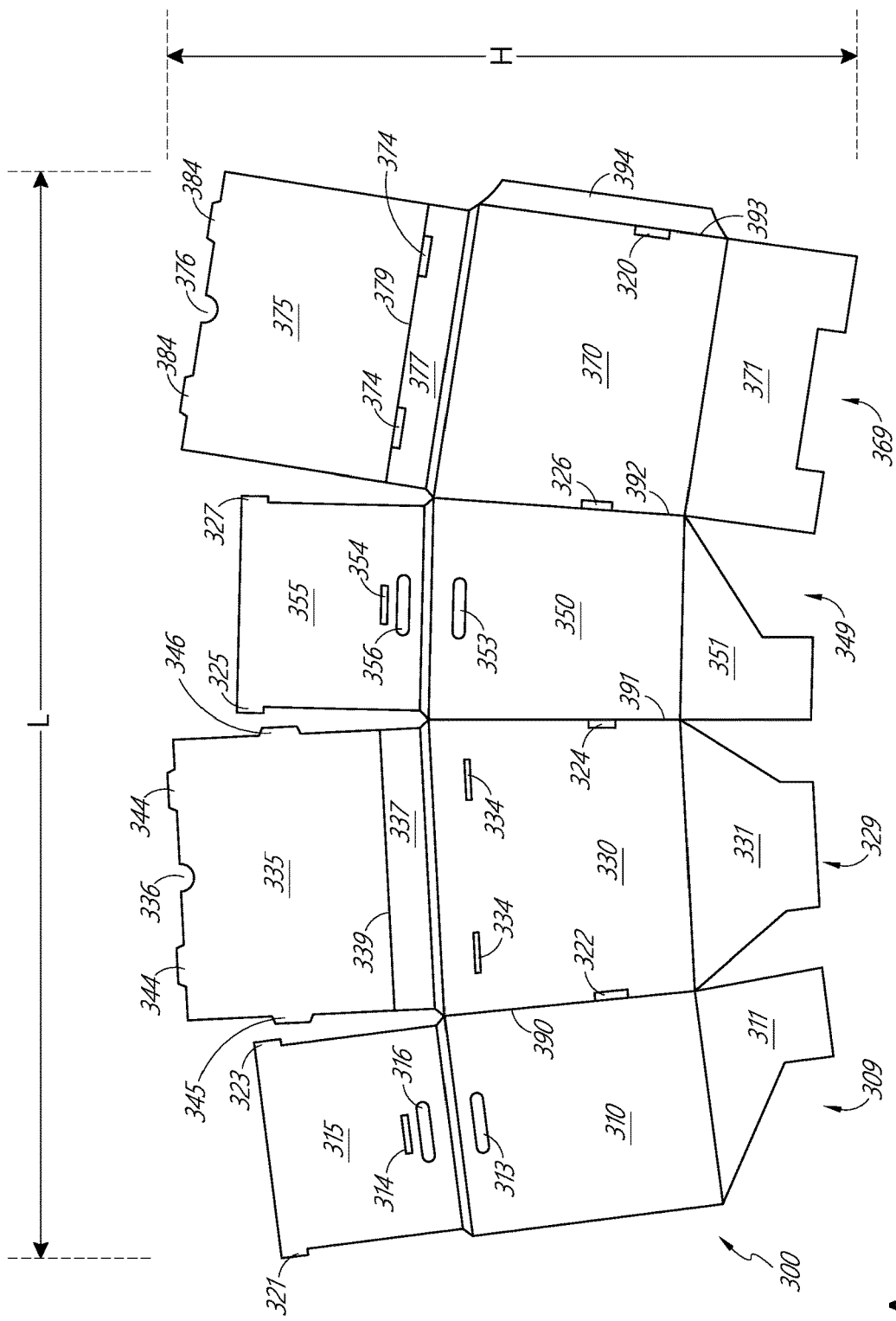
FIG. 3A depicts a top view of an embodiment of a reusable stackable shipping box in an unassembled state.

FIG. 3A illustrates a top view of one embodiment of a box 300, in its unassembled, flattened state. In some embodiments, the box 300 may be comprised of a unitary piece of material. Alternatively, the various segments and portions may be connected by attachment means, including, for example, glue, tape, and staples. The box material comprises material suitable for the construction of boxes, such as, for example, corrugated fiberboard, paperboard, plastics, polymers, and recycled materials. Corrugated fiberboard is a material having two linerboards, wherein a fluted medium is positioned between the two linerboards. In some embodiments, the linerboards and the medium may be made from paper material.

As shown in FIG. 3A, this embodiment comprises four main segments. First segment 309 comprises a front face 310, a first bottom fold 311, and a front flap 315. The front face 310 comprises a first front elongated handle opening 313, which penetrates entirely through the box material, and which may be used as a handle for grasping and carrying the box 300 after it is assembled. The front flap 315 comprises a second front elongated handle opening 316 and a front support slot 314. The first assembly flap 315 also comprises a first assembly tab 321 and a second assembly tab 323. The front flap 315 is connected to the front face 310 along a score line that demarcates the front flap 315 from the front face 310.

First segment 309 is adjacent to second segment 309, and sits substantially parallel to second segment 309. Notably, the segments are not perfectly parallel, due to the tapered design of the box, as previously disclosed and described. Second segment 309 comprises a first side face 330 that is joined to front face 310. A score line 390 demarcates first side face 330 from front face 310. Second segment 309 also comprises a second bottom fold 311 and a first side flap 335. First side face 330 comprises first support slots 334 and a second assembly slot 322 and a third assembly slot 324. The second assembly slot is located along the score line 390, and is configured in size, shape, and location for insertion of the second assembly tab 323. The third assembly slot is located along a score line 391, and is configured in size, shape, and location for insertion of a third assembly tab 325. The first side flap 335 comprises second support tabs 344, a front support tab 345, a rear support tab 346, and a first finger slot 336. First flap 335 also comprises a score line 339 that creates a first segment 337, which is attached to the first side face 330 along one length and the first side flap 335 along the opposite length Third segment 309 is adjacent to second segment 309, and is demarcated from second segment 309 with the score line 391. Third segment 309 is substantially parallel to second segment 309, but is not entirely parallel with second segment 309, thereby creating a slight taper as described previously. Third segment 309 comprises a rear face 350, a third bottom fold 311, and a rear flap 355. The rear face 350 comprises a first rear elongated handle opening 353, which entirely penetrates the box material, and which may be used as a handle for grasping and carrying the box 300 when it is in its assembled state. The rear flap 355 comprises a second rear elongated handle opening 356 and a rear support slot 354. The rear flap 355 also comprises a third assembly tab 325 and a fourth assembly tab 327.

Fourth segment 309 is adjacent to third segment 309, and is demarcated from third segment 309 with a score line 392. Fourth segment 309 is substantially parallel to third segment 309, but is not perfectly parallel to third segment 309, thereby allowing for a slight taper, as previously described. Fourth segment 309 comprises a second side face 370, a fourth bottom fold 311, and a second side flap 375. The second side face 370 comprises a fourth assembly slot 326 and a first assembly slot 320. The fourth assembly slot 326 is located along the score line 392, and is configured in size, shape, and location for insertion of fourth assembly tab 327. The first assembly slot 320 is located along a score line 393, and is configured in size, shape, and location for insertion of first assembly tab 321. The second side face 370 also comprises a joint segment, or a manufacturer's joint 394 that is used during assembly of the box 300. The manufacturer's joint 394 is demarcated from the second side face 370 by the score line 393. The second side flap 375 comprises first support tabs 384, second support slots 374, and a second finger slot 376. The second support slots 374 are located along a score line 379 that runs the length of the second flap 375, and which creates a second segment 377, which is attached to the second side face 370 along one length and the second side flap 375 along the opposite length.

Also provided herein are methods of assembling the reusable stackable shipping box. The method is provided wherein a flattened unitary piece of material is provided, and the user folds the material into a box. Alternatively, separate portions and segments are provided, and the portions may be united by attachments means, including, for example, glue, tape, or staples. The method further provides an assembled box, wherein the user places goods with the box, and the user closes the box such the box is capable of stacking upon other boxes or of being stacked upon in a stable manner and concomitantly protecting the goods contained therein.

For assembly of the stackable shipping box 300 of FIG. 3A, the user takes the manufacturer's joint 394 located on fourth segment 309 and attaches it to first segment 309, along the front face 310. In some embodiments, the manufacturer's joint 394 is attached to a surface of the front face 310 which faces the interior volume of the box 300 when the box is assembled. The joint 394 may be joined with adhesive to first segment 309, or alternatively may be stitched, stapled, or taped. One of skill in the art will recognize that the joint 394 may be attached to first segment 309 by attachment means, as previously described herein. Attachment of the manufacturer's joint 394 to first segment 309 creates a four sided box, with each of segments 309, 329, 349, and 369 making a side of the box. The first through fourth bottom folds 311, 331, 351, and 371 are demarcated from their respective faces with score lines. The first through fourth bottom folds 311, 331, 351, and 371 are folded up along the length of the score lines in an interlocking manner to create the bottom of the box. One of skill in the art will recognize that the bottom folds are configured in size and shape for efficient folding together to create a supportive bottom or floor of the box, and could by any number of suitable configurations, including the configuration as disclosed in the embodiment shown by FIG. 3A.

The front flap 315 and the rear flap 355 are demarcated from their respective faces with score lines. The front flap 315 is folded down along the length of the score line to the interior of the box 300, such that the front flap 315 sits parallel with the inside surface of the front face 310. Similarly, the rear flap 355 is folded down along the length of the score line to the interior of the box 300, such that the rear flap 355 sits parallel with the inside surface of the rear face 350. First assembly tab 321 is configured in size, shape, and location for placement into first assembly slot 320 upon folding of the front flap 315 down into the box 300. Similarly, second assembly tab 323, third assembly tab 325, and fourth assembly tab 327 are configured in size, shape, and location for insertion into second assembly slot 322, third assembly slot 324, and fourth assembly slot 326, respectively. The second front elongated handle opening 316 aligns with the first front elongated handle opening 313, such that the opening extends entirely through both the front face 310 and the front flap 315. Similarly, the second rear elongated handle opening 356 aligns with the first rear elongated handle opening 353, such that the opening extends entirely through both the rear face 350 and the rear flap 355.

The first side flap 335 and the second side flap 375 are demarcated from their respective faces with score lines. The user may fold first and second flaps 335 and 375 down into the box 300 prior to packing the box. Alternatively, the user may pack the box 300 with goods prior to folding first and second flaps 335 and 375. After packing the box 300, the user folds the second segment 377 down into the box only to the score line 379, such that the second segment 377 sits flush with, and parallel to the inside surface of second side face 370. For example, the second segment 377 may be folded along the top edge of the second side face so the second segment 377 is folded through an angle of approximately 180°. The second side flap 375 is folded along score line 379 to extend across the opening of the box 300, whereupon the first support tabs 384 are placed into the first support slots 334 that are located on the first side face 330. The second side flap 375 can be folded to be positioned at an angle of approximately 90° relative to the surface of the second segment and the second side face. The first side flap 335 is then folded down along a top edge of the first side face into the box only to the score line 339, such that the first segment 337 sits flush with, and parallel to the inward facing surface of the first side face 330. For example, the first segment 337 is folded down to through an angle of approximately 180° relative to the first side face 330. The first side flap 335 then is folded along the score line 339 such that the first side flap 335 extends across the second side flap 375, such that it sits flush with, and parallel to the second side flap 375, whereupon the second support tabs 344 are inserted into the second support slots 374 on the second side flap 375. The front support tab 345 is inserted into the front support slot 314, and the rear support tab 346 is inserted into the rear support slot 354. This configuration provides for a strong top support that is parallel to the bottom of the box, such that the goods located inside the box 300 do not become damaged. In addition, because the first segment 337 and the second segment 377 extend down into the interior of the box, the first and second side flaps 335 and 375 create a recessed top of the box 300, creating a lip around the top of the box 300 that allows for other stackable boxes to be placed upon the lid of the packaged box in a stable manner. As described previously, the box is slightly tapered, such that the top of the box is slightly larger than the bottom of the box, whereby the size of the open support region supports dimensions of the bottom of a box.

In some embodiments of the reusable box, the box 300 is provided wherein the length (L) of the unassembled flattened box is 60.226 inches and the height (H) is 42.058 inches. In some embodiments, L is 80.329 inches, and H is 50.289 inches. One of skill in the art will recognize that the aforementioned dimensions are for illustrative purposes only, and that any number of dimensions, sizes, and shapes can be realized within the scope of the disclosure provided herein.

Figure 3B:
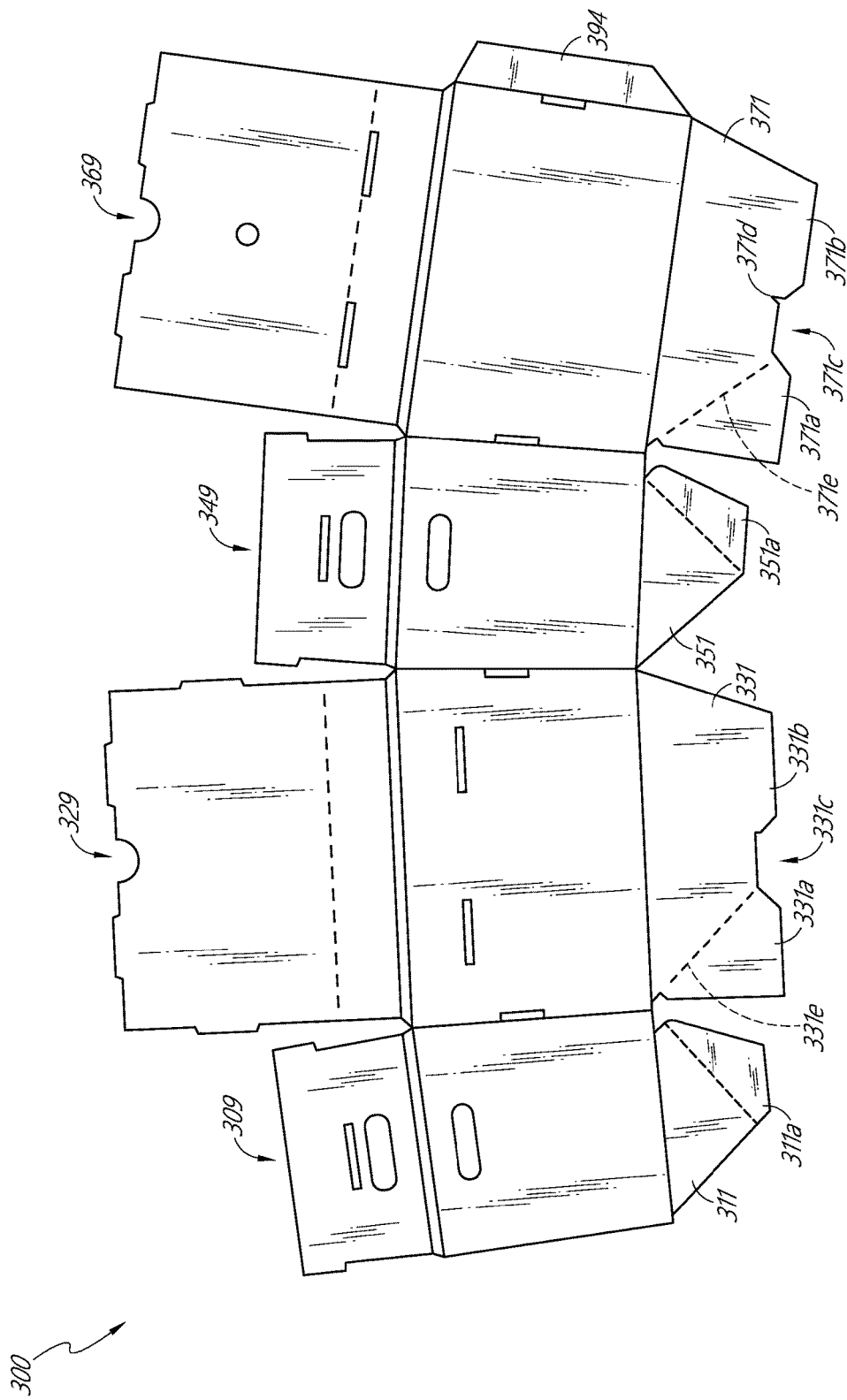
FIG. 3B depicts a top view of another embodiment of a reusable stackable shipping box in an unassembled state.

By way of example, the bottom can be an auto-lock bottom box, a 1-2-3 bottom box, or any other box bottom. FIG. 3B depicts an top view of an embodiment of a reusable box 300 having an auto-lock bottom shown in an un assembled state. The reusable box 300 comprises first, second, third, and fourth segments 309, 329, 349, 369 as described elsewhere herein. First segment 309 comprises first bottom fold 311, which, in turn, comprises first attachment portion 311a. The first attachment portion 311a may comprise an adhesive or other attachment mechanism. The second segment 329 comprises second bottom fold 331, which, in turn, comprises second attachment area 331a. The second bottom fold 331 also includes a first tab 331b and a first tab notch 331c. The second attachment area 331 may comprise an adhesive on an underside of the attachment area 311a, or may comprise another attachment mechanism. When the box 300 is folded or assembled, the underside of the second attachment portion 331a is placed over and attaches to the first attachment area 311a using an adhesive, glue, tape, staple, or other similar attachment mechanism.

The third segment 349 comprises the third bottom fold 351, which comprises third attachment area 351a. The fourth segment comprises fourth bottom fold 371, which comprises fourth attachment area 371a. The fourth bottom fold 371 also includes a second tab 371b, a second tab notch 371c, and a third tab notch 371d. Similar to first and second attachment areas 311a, 331a, fourth attachment area 371a is configured to cover and attach to third attachment area 351a when the box 300 is folded or assembled. The attachment at first and second attachment areas 311a and 331a, and at 351a and 371a, can be fixed attachments, such that the bottom folds which are attached do not separate. This allows attachment of the manufacturer's joint 394 as described elsewhere herein, and flattening of the box, by moving the first, second, third, and fourth bottom folds 311, 331, 351, 371 into the volume of the box 100. When moving the first, second, third, and fourth bottom folds 311, 331, 351, and 371 into the volume of the box 300, the second and fourth bottom folds bend along first and second score lines 331e, 371e to accommodate the attachment between the bottom folds as described herein.

When the box 300 is ready to be used, the box 300 is unflattened, the first, second, third, and forth bottom folds 311, 331, 351, 371 extend from the internal volume of the box by virtue of the attachment between attachment areas 311a and 331a, and 351a and 371a. As the box is assembled, the first tab 331b moves into the second tab notch 371c and the second tab 371b moves into the first tab notch 331c. The first tab 331b then further moves into third tab notch 371d, where the tab contacts an edge of the fourth bottom fold, contacts a second tab 371b. The second tab 371b contacts an edge of the second bottom fold 331.

Figure 3C:
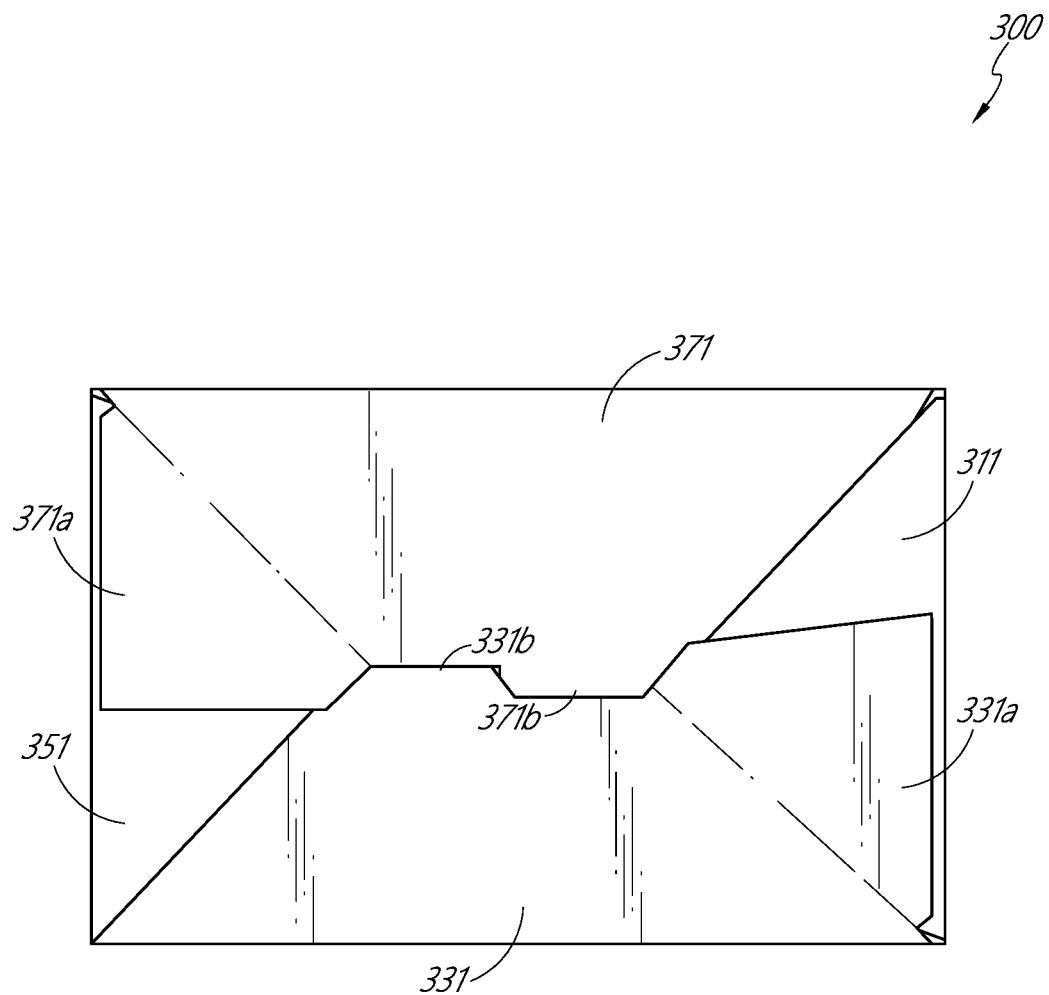
FIG. 3C depicts a bottom view of the reusable stackable shipping box of FIG. 3B.

FIG. 3C shows a bottom view of an embodiment of the box 300 of FIG. 3B in an assembled state with the first and second attachment areas 311a, 331a attached to each other, third and fourth attachment areas 351a, 371a attached to each other, first tab 331b inserted into second tab notch 371c and third tab notch 371d, and second tab 371b inserted into first tab notch 331c.

Figure 4A:
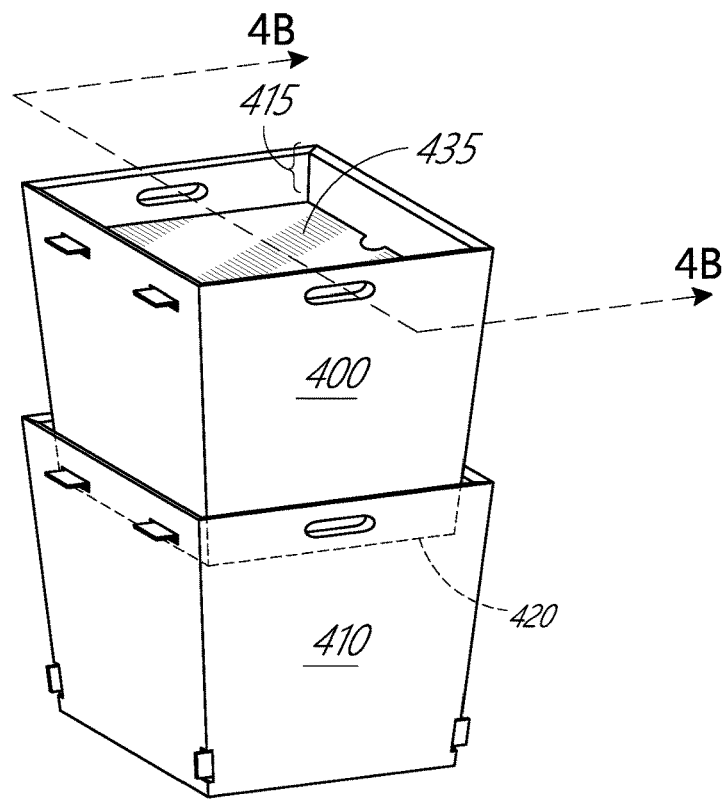
FIG. 4A illustrates a perspective view of one embodiment of a reusable stackable shipping box stacked with a second reusable stackable shipping box.

FIG. 4A illustrates a perspective view of two stacked boxes of one embodiment of the reusable box, wherein the stackable feature of the stackable shipping boxes is illustrated. In this embodiment, a first upright, assembled, closed stackable shipping box 400 is placed upon a second upright, assembled, closed stackable shipping box 410. Box 400 is stacked upon box 410, such that the bottom portion of box 400 is recessed down into box 410, within the lip region. Dashed lines 420 on box 410 illustrate the lip region upon which box 400 is stacked, and further illustrates that shipping box 400 is placed somewhat within the top portion of shipping box 410, thereby creating a stable stacking position.

In this illustration, shipping box 400 is also closed with the flaps creating a lid and platform, to illustrate a rim 415 that is created upon folding the flaps downward into the box. The flaps create a supportive lid 435, thereby protecting the goods within the box. The configuration of the flaps also provides for a rim 415 within which other boxes may be stacked. One of skill in the art will recognize that for the stacking configuration to take place, the boxes may be tapered in shape, such that the bottom portion of the box is somewhat smaller than the upper portion of the box. Thus, a smaller bottom of one box is capable of stacking within the larger upper portion of another box, as described previously.

Certain embodiments of the reusable box include boxes wherein upon assembly, the boxes are tapered in configuration. Such tapering allows the boxes to readily stack one within the other, such that the bottom of the box is slightly smaller than the top of the box. Thus, the smaller bottom of one box can fit within the larger recessed top of another packed box. In one embodiment, the tapering of the box follows the algorithm, as previously described elsewhere herein.

Figure 4B:
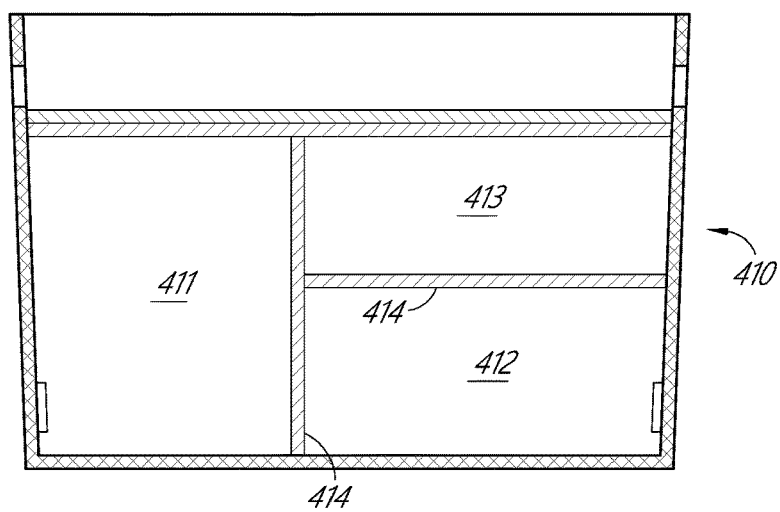
FIG. 4B illustrates a cutaway view of one embodiment of the reusable stackable shipping box taken along line 4B-4B'.

FIG. 4B illustrates a side cutaway view of one embodiment of the stackable shipping box 410 taken along line 4B-4B to illustrate one embodiment of the inside of the box in the assembled position. In this embodiment, box 410 comprises three main compartments: a frozen compartment 411; a chilled compartment 412; and an ambient compartment 413. The frozen compartment 411 is configured in size and shape for the placement of a cooler, a bag, or a receptacle, that may contain frozen goods. Alternatively, the frozen goods may be placed directly into the box 410, with the addition of ice, dry ice, gel packs, or other elements used to maintain cold temperatures. Frozen goods may include, for example, frozen meats, frozen vegetables and fruits, or frozen dairy products. The chilled compartment 412 is located on the bottom of the box 410 and is configured in size and shape for the placement of a container containing chilled goods. Chilled goods may include, for example, dairy products and other perishable items that require chilling. The ambient compartment 413 is configured in size and shape for the placement of goods, such as non-perishable goods that do not demand any particular temperature requirements. Ambient items may include, for example, canned goods, electronic goods, or other goods fit for shipment in ambient temperature. In this embodiment, a divider 414 may be provided to separate the various compartments and to keep the contents securely in place.

The divider 414 can be a separate unit that can be placed within the box 410 after assembly of the box, and for the purpose of providing separate compartments for the shipment of goods. In some embodiments, the divider 414 can be integrated into the box 410, or can be fixedly attached within the box 410. The divider 414 comprises a vertical portion and a shelf portion. The shelf portion is moveably attached to the vertical portion, and can be folded to be parallel to the vertical position, or can be moved to be perpendicular to the vertical portion. The shelf portion comprises a horizontal portion and a support portion. When the divider 414 is inserted into the receptacle the shelf portion can be folded down from a vertical position to position the horizontal portion of the shelf portion perpendicular to the vertical portion, and the support portion of the shelf portion will extend perpendicular to the horizontal portion and parallel to the vertical portion. The support portion acts like a table leg or chair leg to support the horizontal portion, and to allow the shelf portion to support the weight of an object placed thereon. By folding the shelf portion into position (as shown), the internal volume of the box 410 is divided into the three illustrated portions, including the frozen compartment 411, the chilled compartment 412, and the ambient compartment 413.

In some embodiments, the frozen compartment 411 can be defined by an insulating box or insulating insert configured to fit within at least a portion of the receptacle 400. The insulating box or insert can have at least one vertical wall which can form the vertical portion of the divider 414. The shelf portion can be a separate piece comprising a horizontal portion and a support portion. The support portions can extend vertically to the horizontal portion to provide support for the horizontal portion, to allow the shelf portion to form a compartment below the horizontal portion, such as the chilled compartment 412, and to receive objects on the horizontal portion, such as in the ambient compartment 413.

Those of skill in the art will readily recognize that the embodiment described in FIG. 4B is exemplary only, and that many and various embodiments can be realized with various modifications of the descriptions provided herein.

Figure 5:
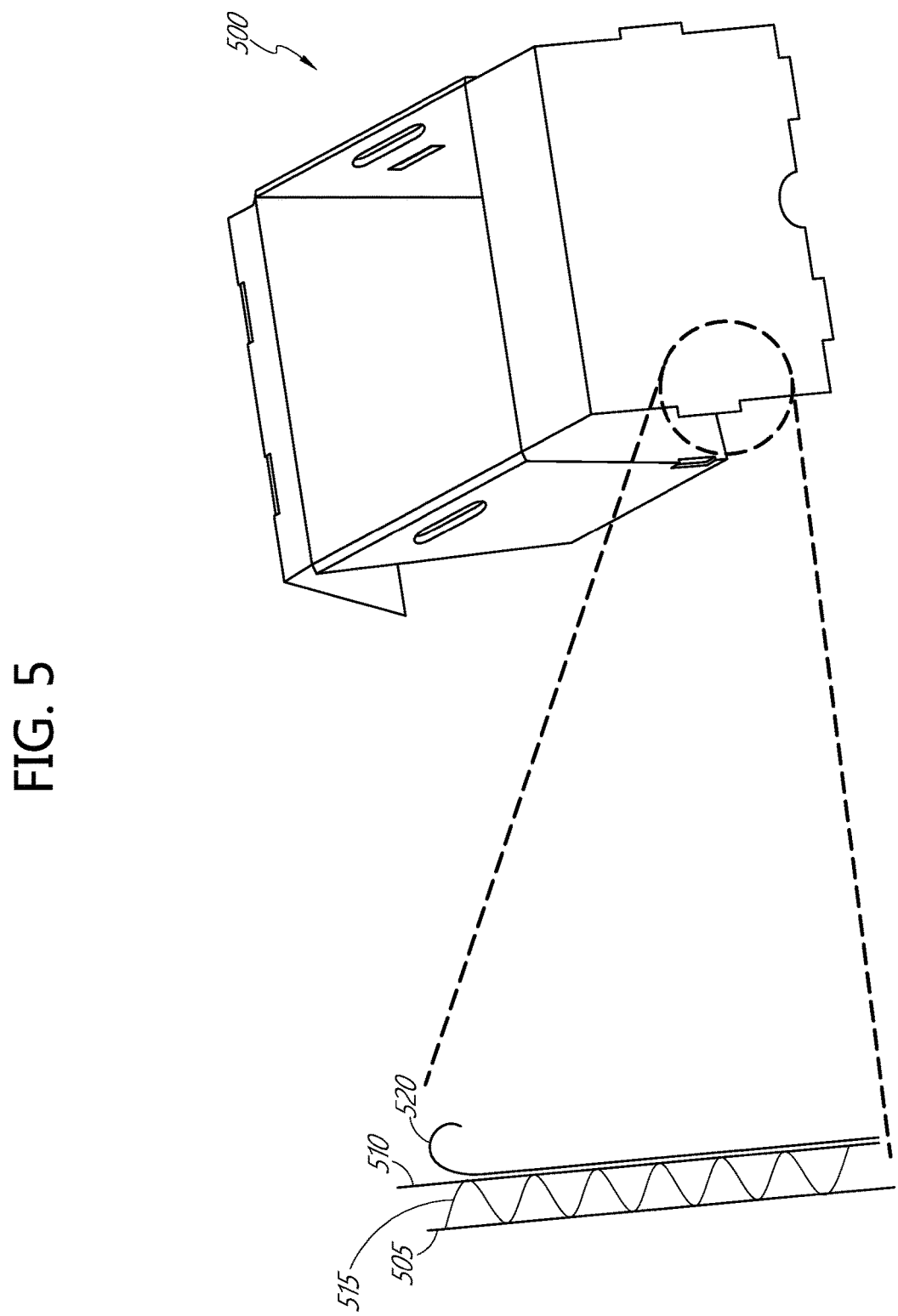
FIG. 5 illustrates one embodiment of the reusable box, wherein the reusable stackable shipping box comprises a box material having water- and grease-resistant coating applied thereon.

FIG. 5 is a perspective view of one embodiment of the shipping box 500 as described herein. In this embodiment, the stackable shipping box 500 may be comprised of a suitable material for the construction of boxes, such as, for example, corrugated fiberboard, paperboard, plastics, polymers, and recycled materials. Corrugated fiberboard may comprise three main layers: two flat linerboards with fluted medium between the linerboards. The choice of the material for the fluted medium and for the linerboards can vary depending on the various applications and requirements for strength, but generally are manufactured with paper. The linerboards can be single-walled, double-walled, or triple-walled, depending on the various applications or requirements of strength and robustness. In some embodiments, the corrugated fiberboard comprises a first linerboard 505, a second linerboard 510, and a fluted medium 515.

In some embodiments, the corrugated fiberboard, paperboard, or other box material further comprises a layer of water- and grease-resistant coating 520. The water- and grease-resistant coating can be, for example, a polymer. One example of a polymer that is water- and grease-resistant is Micryl™ 766RN, which may be applied to one or both of the first and second linerboards 505 and 510. Another example of water- and grease-resistant material is a closed-cell foam, which not only provides water- and grease-resistance, but also helps insulate the shipping receptacle. The water- and grease-resistance coating 520 may be applied to or integrated with the corrugated fiberboard, which prevents the assembled stackable shipping box from soaking up liquid and condensation as is common with the shipment of perishable goods. In addition, the water- and grease-resistance coating 520 enables a user to readily clean the box prior to reuse without the prospect of damaging the box in the process of cleaning. The water- and grease-resistance coating 520 is applied or integrated by various means, but by way of illustration only, the material may be laminated or glued onto the corrugated fiberboard. In particular, the water- and grease-resistance coating 520 may be gluable with cold set and hot melt adhesives.

As one of skill in the art recognizes, containers for the shipment of perishable goods are commonly reused. The shipment of perishable goods frequently soils the shipping containers. In order to prepare the container for reuse, the shipping company must first clean the container. However, certain materials are not amendable for cleaning, such as cleaning by water, because the material readily breaks down. Corrugated fiberboard comprised of paper is not capable of withstanding the cleaning process without breaking down. However, the placement of the water- and grease-resistance coating 520 on the corrugated fiberboard surface assists in the ease of cleaning and also enables the container itself to withstand the cleaning process and thereby become suitable for reuse. In some embodiments of the reusable box, the box having a water- and grease-resistant coating applied thereon is recyclable.

The above description discloses several embodiments and materials a reusable box. This reusable box is susceptible to modifications and alterations in the embodiments. Such modifications will become apparent to those skilled in the art from consideration of this disclosure or practice of the reusable box disclosed herein. Consequently, it is not intended that this reusable box be limited to the specific embodiments disclosed herein, but that it cover all modifications and alternatives coming within the true scope and spirit of the reusable box as embodied in the attached claims.

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the invention should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references cited herein are incorporated herein by reference in their entirety. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention as embodied in the attached claims.

What is claimed is:

1. A method for assembling a receptacle comprising:
    folding a front flap attached to a front face along an edge of the front face, the front flap comprising a front support slot;
    folding a first side flap connected to a first side face, the first side flap comprising a second support tab, a front support tab, and a rear support tab, wherein the first side face is attached to the front face and the first side face comprises a first support slot;
    folding a rear flap attached along an edge of a rear face, the rear flap comprising a rear support slot, wherein the rear face is attached to the first side face;
    folding a second side flap connected to a second side face, the second side flap comprising a second support slot and a first support tab, wherein the second side face is attached to the rear face;
    inserting the first support tab into the first support slot;
    inserting the second support tab into the second support slot;
    inserting the front support tab into the front support slot; and
    inserting the rear support tab into the rear support slot.

2. The method according to claim 1, wherein the front face further comprises a front handle opening and the rear face further comprises a rear handle opening.

3. The method according to claim 1, wherein the second support tab is formed along a first edge of the first flap, the front support tab is formed along a second edge of the first flap, and the rear support tab is formed along a third edge of the first flap.

4. The method according to claim 3 wherein the first side flap is connected to the first side face via a first segment attached to the first side face along an edge of the first side face;
    wherein the first segment is attached to the first side flap along an edge of the first side flap;
    wherein the second side flap is connected to the second side face via a second segment attached to the second side face along an edge of the second side face; and
    wherein the second segment is attached to the second side flap along the edge of a first side flap.

5. The method according to claim 4, further comprising:
- folding the second segment along a score line corresponding to the edge of the second side face to which the second segment is attached such that at least a portion of a first planar surface of the second segment contacts a second planar surface of the second side face;
- folding the second segment along a score line corresponding to the edge of the second segment which is attached to the second flap to approximately a right angle to the first planar surface of the second segment;
- folding the first segment along a score line corresponding to the edge of the first side face to which the first segment is attached such that at least a portion of a first planar surface of the first segment contacts a second planar surface of the first side face;
- folding the first segment along a score line corresponding to the edge of the first segment which is attached to the first flap to approximately a right angle relative to first planar surface of the first segment.

6. The method according to claim 1, wherein the front flap is folded along a score line corresponding to the edge of the front face to which the front flap is attached.

7. The method according to claim 1, wherein the front face is tapered with a decreasing dimension from the edge of the front face to a second edge of the front face, which is opposite the edge of the front face, and wherein rear face is tapered with a decreasing dimension from the edge of the rear face to a second edge of the rear face, which is opposite the edge of the rear face.

* * * * *